United States Patent

Molloy

[15] 3,685,346
[45] Aug. 22, 1972

[54] DIRECT READING QUANTITATIVE GAS MEASURING DEVICE

[72] Inventor: Everett W. Molloy, Yellow Springs, Ohio

[73] Assignee: The Yellow Springs Instrument Company, Inc., Yellow Springs, Ohio

[22] Filed: Jan. 16, 1970

[21] Appl. No.: 3,323

[52] U.S. Cl. ...................................73/23, 204/195 P
[51] Int. Cl. ............................G01n 7/00, B01k 3/00
[58] Field of Search .......73/19, 23, 53; 204/1.1, 194, 204/195; 340/237; 210/85; 137/88, 93; 324/30; 23/230, 253

[56] References Cited

UNITED STATES PATENTS

| | | | |
|---|---|---|---|
| 2,528,889 | 11/1950 | Kohl | 324/30 |
| 2,949,765 | 8/1960 | Thayer | 324/30 X |
| 3,235,477 | 2/1966 | Keyser | 204/195 |
| 3,503,861 | 3/1970 | Volpe | 204/195 |
| 3,510,421 | 5/1970 | Gealt | 204/195 |
| 3,406,109 | 10/1968 | Molloy | 204/195 P |
| 3,429,784 | 2/1969 | Molloy | 204/195 P X |

Primary Examiner—Richard C. Queisser
Assistant Examiner—C. E. Snee, III
Attorney—Marechal, Biebel, French & Bugg, Joseph G. Nauman, Gilbert Henderson, Mario A. Mantella, Edward P. Forgrave and Thomas W. Flynn

[57] ABSTRACT

A gas (oxygen) sensor measures the partial pressure of a gas in a mixed fluid (water and absorbed gases) and provides an output signal proportional to the partial pressure of the gas to which the sensor is exposed. An electronic amplifier receives this signal and drives a meter giving visual indication of the signal from the sensor. Prior to taking a reading with the device, a series of compensation steps are followed which change the meter indication with respect to the sensor output in order to compensate for changes in solubility of the gas in the fluid due to temperature differences, barometric pressure changes (with changes in altitude) and changes in the salinity of the fluid. When the reading is taken, the meter indicates directly the amount of gas (oxygen) present in the fluid in parts per million (PPM).

3 Claims, 2 Drawing Figures

FIG-2

DIRECT READING QUANTITATIVE GAS MEASURING DEVICE

BACKGROUND OF THE INVENTION

A Clark type oxygen sensor, such as shown in U.S. Pat. No. 2,913,386, measures oxygen pressure. Outside the membrane of the sensor the oxygen pressure is the ambient pressure to be measured, and inside the membrane next to the cathode, oxygen pressure is zero because the oxygen is consumed as it reaches the cathode. A pressure drop appears across the membrane, and oxygen flows or diffuses through the membrane because of the pressure differential. The flow of oxygen through the membrane (neglecting temperature effects) is directly proportional to the differential oxygen pressure across the membrane. Since the inside oxygen pressure is essentially zero, the flow of oxygen is proportional to the absolute pressure of oxygen external to the membrane.

The chemical reaction within the sensor or cell produces a current which is in direct stochiometrical relation to the amount of oxygen being consumed, hence, the cell current is directly proportional to the oxygen pressure to which the sensor is exposed.

When a liquid is saturated with a gas, the partial pressure of the gas dissolved in the liquid is equal to the partial pressure of the gas above the liquid. For example, in water saturated with air and at the same temperature as the air, the oxygen sensor produces the same current when immersed in the water as when exposed to the air above it.

The amount of oxygen which can be dissolved in water (as an example of a mixed fluid containing various gases) is a function of the temperature of the water. When the water is saturated with oxygen, the pressure of the dissolved oxygen equals the pressure of oxygen above the water. In this state of equilibrium, oxygen from the gas above the water enters the surface of the water at the same rate that dissolved oxygen escapes from the water into the gas above it. If the temperature rises, more oxygen leaves the water than enters it from the gas, and a new equilibrium is eventually established. Lowering the temperature permits more oxygen to dissolve in the water until again in the water equilibrium is established. In addition, barometric pressure, which changes with altitude, will affect the amount of oxygen dissolved in water, and an increase in salinity will decrease the solubility of oxygen in water.

Heretofore, the oxygen sensor output has been appropriately amplified to produce an indicator output on a suitable meter, the temperature has been determined, and then various auxiliary tables or slide rules have been used to make the various computations affecting the amount of oxygen dissolved in the liquid in order to obtain the actual amount of oxygen dissolved in the liquid. Thus, the operator of such instruments must take a reading and then perform a number of calculations, or look up various factors on charts or tables, before arriving at an answer.

SUMMARY OF THE INVENTION

The present invention provides a device in which the use of auxiliary tables or slide rules is not required for calibration or measurement. A precise thermistor compensates for the temperature coefficient of the sensor membrane. Compensating circuits in the device are arranged for dial-in correction for oxygen solubility changes with temperature. In addition, a calibration compensation for changes in altitude, i.e., barometric pressure, is provided along with a dial-in compensation for salinity values ranging from fresh water to sea water. The meter thus reads out, when calibration is complete and a reading is taken, directly in PPM dissolved oxygen.

The principal object of the present invention, therefore, is to provide a device for determining the amount of a gaseous constituent, such as oxygen, dissolved in a fluid such as water containing dissolved gases, and providing a direct reading in PPM of the amount of the gaseous constituent; to provide such a device in which calibration can be made to compensate for changes in solubility of the gas in the fluid with changes in temperature; to provide means for compensating for changes in gas solubility due to changes in barometric pressure; and to provide a device having means for compensating for changes in gas solubility due to variations in salinity of the fluid containing the gas.

Other objects and advantages of the invention will be apparent from the following description, the accompanying drawings and the appended claims.

BRIEF DESCRIPTION OF THE DRAWINGS

FIG. 2 is an electrical schematic diagram showing the circuits employed in the device.

DESCRIPTION OF THE PREFERRED EMBODIMENT

Figure 1:
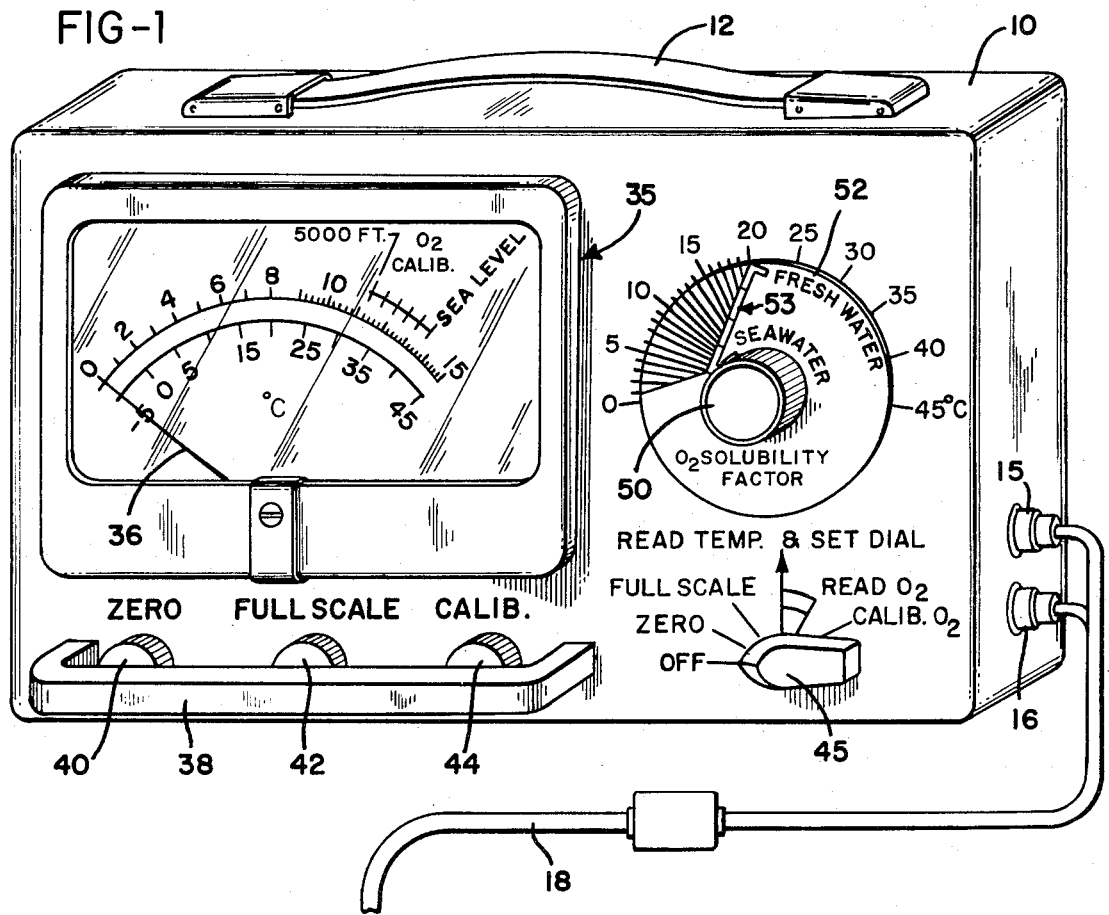
FIG. 1 is a pictorial view of the device with an oxygen/temperature probe attached thereto, showing the indicating meter and its various scales, together with the switching controls for calibration and reading and the controls used in calibrating the device.

Referring particularly to FIG. 1 of the drawings, the instrument comprises a portable case 10 having a carrying handle 12, and external socket connections 15 and 16 which receive appropriate plugs on the end of a cable 18 extending from an oxygen/temperature probe unit 20. The probe unit comprises a polarographic cell 22, which may be generally of the type shown in U.S. Pat. No. 2,913,386, and above the cell there is a seal or stopper 23 fitted into a cylindrical calibration container 25. A stopper 26 (shown removed) fits into the lower end of the cylinder 25. A tubular supporting handle 28, connected to the interior of the cylinder 25, is used to support the probe within the media or mixed fluid, such as water, where a measurement is to be made, and the hollow tube provides a communication between the interior of the enclosed cylinder 25 and the atmosphere surrounding the media, for purposes of calibration. A ring 30 extends between the tube 28 and the cylinder 25, providing a convenient mounting for the cell 22, as shown in dotted lines, when measurements are being taken. The cell 22 provides the oxygen measuring sensor of the probe, and an encapsulated thermistor 32 provides the temperature sensor of the probe.

The case 10 has mounted on its front face a meter 35 including an indicating needle 36 controlled by a conventional galvanometer action (not shown). The needle cooperates with three different scales, the lowermost scale being a temperature scale calibrated in degrees Centigrade, the middle or main scale providing direct readout of oxygen content in parts per million (PPM), and a barometric pressure calibration scale shown in the upper right corner of the meter face.

Beneath the meter, and surrounded by a protective bar 38 to avoid accidental movement of the respective knobs, are a control knob 40, controlling a zero adjusting potentiometer 40a (FIG. 2), a knob 42 controlling a full scale calibration potentiometer 42a, and a knob 44 controlling a calibration potentiometer 44a. These knobs are adjusted during calibration of the instrument as explained later.

Figure 2:
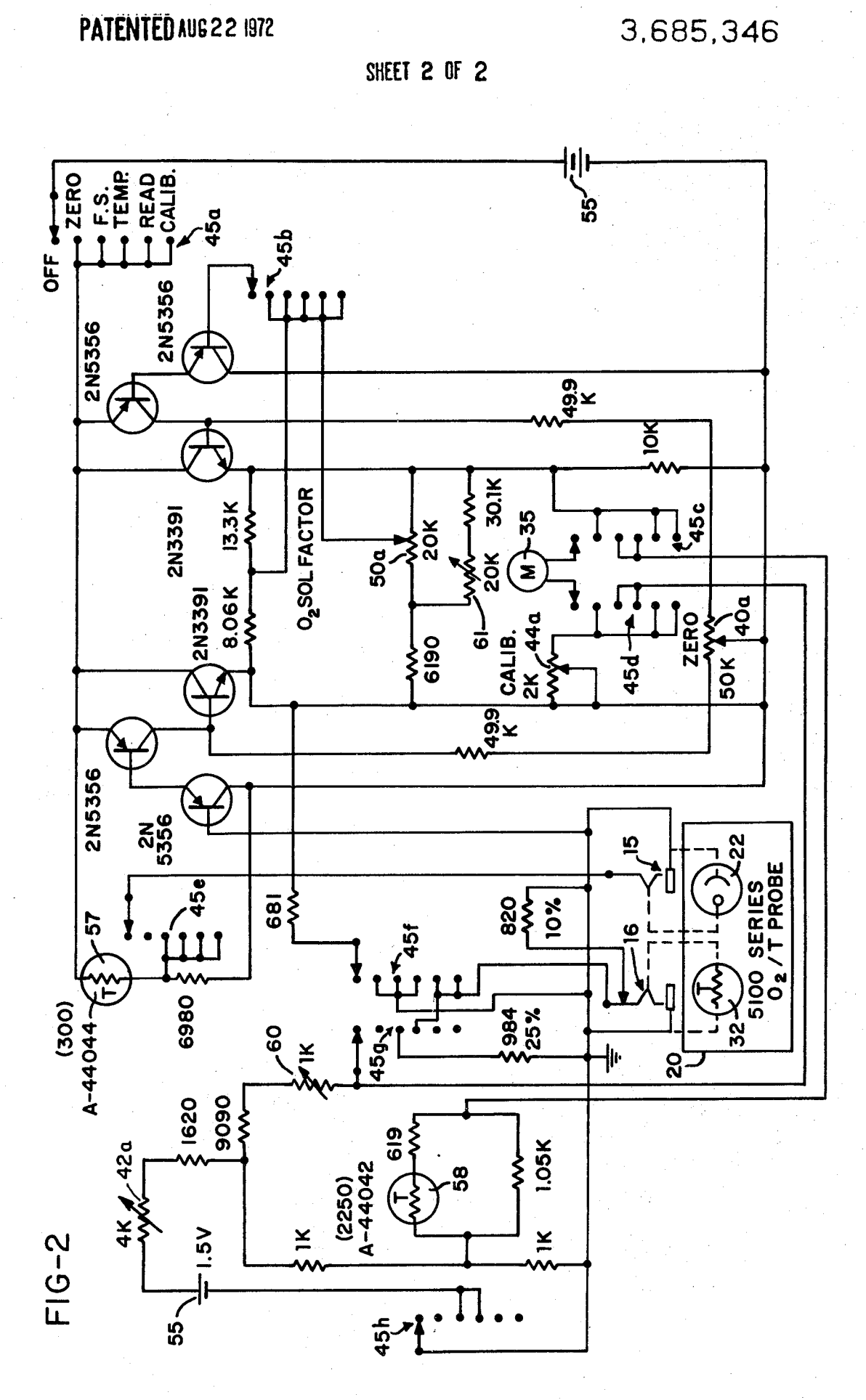

To the right of these calibrating controls is a six position selector and control switch which has a control handle or knob 45 that controls the position of the wipers in eight separate units or "decks" of a multi-position switch, these being shown respectively by reference numerals 45a–45h on FIG. 2. The wipers of this multiple contact switch are controlled in unison by the knob 45, and the positions are indicated on the face of the case of housing, as shown in FIG. 1. The corresponding positions are shown in FIG. 2 alongside the switch section 45a and it will be understood that the other sections of the switch have corresponding positions with the wipers moving in unison.

To the right of the meter, on the face of the case, is a control knob 50 which is connected to a potentiometer 50a for the purpose of providing an adjustment according to the oxygen solubility factor at a particular temperature and for a particular kind of media or fluid being tested. The knob includes a disc-like rotating dial member 52 which has a rather wide V-shaped notch formed along one edge to uncover parts of a temperature scale formed on the case underlying the disc 52. This scale is in degrees Centigrade, corresponding generally to the meter temperature scale. Along one edge of the notch, indicated generally by the reference numeral 53, there is a compensating scale which is calibrated in terms of salinity of the media to be measured, the scale being marked off by an index for fresh water, at the periphery of the disc 52, and an index for sea water at the base or apex of the notch. Marks on the scale 53 are intended to be aligned with appropriate radially extending lines of the temperature scale underlying the disc or dial 52.

Referring to FIG. 2, which is a circuit diagram of the solid state circuit and its power supply, all contained within the case 10, power is supplied by batteries 55 as indicated, and the multi-position control switch 45a–45 is shown in the "off" position, as is the knob 45 shown at FIG. 1. The oxygen/temperature probe unit is shown surrounded by a schematic box indicative of the probe and its housing, and the wiring connections included in the cable 18 (FIG. 1) are shown in dotted lines extending from the polarographic cell 22 and the thermistor 32 to the respective input sockets 15 and 16. The meter is indicated schematically by the same reference numeral 35, and its connection into the various circuits is through the wipers of switch sections 45c and 45d.

A six transistor balanced feedback amplifier is employed, and power supply to the amplifier is controlled by the wiper of switch sections 45a. The wiper of switch section 45c connects a temperature compensating thermistor 57 to the amplifier in the third through sixth positions of the selector switch, providing a constant voltage to the polarographic cell 22 even though there may be some change in the bias supplied from the power source.

The thermistor temperature probe 32 is connected through the socket 16 and switch sections 45f, 45g, and 45h to a bridge circuit for temperature measurement, and this circuit includes a compensating thermistor 58 having a resistance/temperature characteristic suitable for compensating the meter for variations in its output due to changes in temperature. Potentiometers 60 and 61 are provided with internal adjustments only, and are initially adjusted during manufacture and set-up of the instrument to compensate for slight variations for resistance values of the components.

The operation of the instrument can be understood by an explanation of the steps followed to make a typical measurement of oxygen concentration in water at some known altitude. The first operation is to set the selector switch to the "zero" position, in which power is applied to the amplifier and the measuring circuits, meter 35 is connected to the amplifier, the amplifier output is connected essentially to ground through switch section 45f. There is no signal output to the meter, and at this time knob 40 is adjusted to move potentiometer 40a until the needle 36 is at the zero position on the oxygen concentration scale (the middle scale).

The next step is to move the selector control to the "-full scale" position, which sets up the bridge circuit for later measurement of temperature indicated by the probe thermistor 32. At this time the meter 35 is connected to the temperature measuring bridge circuit, and the thermistor 58 along with the two fixed resistors in the circuit with it, are connected in series with the meter to compensate the meter for any temperature variations. The knob 42 is adjusted at this time until the needle reads full scale on the temperature scale.

At this time the oxygen/temperature probe is prepared for calibration by inserting the cell 22 within the cylinder 25 and closing the cylinder with the stopper 26. The probe is then inserted in the water, and with the selector switch in the full scale position, power is applied to the probe to provide a warm-up period. Assuming that the instrument is being used to make the first of a series of measurements, it is necessary to calibrate for changes in output of the cell 22 with changes in the partial pressure of the oxygen at the site of the measurement.

The selector switch is moved to the sixth or "-calibrate" position, at this time the output of the cell is connected to the input of the amplifier, and the temperature probe or thermistor 32 is connected to compensate for variations in the current output of the cell at the particular temperature of the media in which the measurement is being made. The tube 28 provides a communication from the surrounding air to the interior of the cylinder 25, and the calibration is made on the basis of the partial pressure of oxygen at the particular altitude where the measurement is being taken. This is done by adjusting the knob 44 of the calibration potentiometer 44a until the needle 36 reaches a point on the calibration chart (upper right corner of the meter face) corresponding to the local altitude. This adjustment corrects for variations in the output of the cell corresponding to the local partial pressure of the oxygen, which will decrease at higher elevations.

The probe 22 is removed from the cylinder 25 and exposed to the media (water) in which the measurement is to be made, as by mounting the probe in the support ring 30. Preferably, this should be done somewhat before the temperature reading, in order to allow the polarographic cell to stabilize according to the partial pressure of oxygen within the water.

When these steps have been completed, the instrument is prepared to take readings, and this may require frequent shifting between temperature readings and direct read-out of oxygen in PPM. Therefore, the fourth and fifth positions of the selector switch are arranged next to each other for convenient switching between the two positions. At the position "read temperature" the thermistor 32 in the probe and the bridge circuit are connected directly to the meter 35, and the temperature is indicated on the lower scale of the meter in degrees Centigrade.

After the temperature reading, the knob 50 is adjusted such that the chosen index on the salinity scale 53 is aligned with the radial line on the temperature scale corresponding to the temperature just read. For example, the position shown in FIG. 1 corresponds to a temperature of 20° C. in fresh water. This adjustment of the potentiometer 50a introduces into the circuit a compensation for the solubility factor of oxygen at the temperature at which the measurement is being made. If the measurement is being made in sea water, or in partial sea water such as in the estuary of a river, the appropriate point on the scale 53 is aligned with the temperature scale beneath the dial or disc 52, thereby introducing a further compensation for the lower solubility of oxygen in salt water as compared to fresh water. For example, the position shown in FIG. 1 corresponds to 15° C. in water of 50 percent salinity, or 5° in sea water.

The selector switch is then removed to the fifth position, wherein a direct read-out of oxygen in PPM can be made from the middle or main scale of the meter. It should be emphasized that this read-out is direct, and requires no further calculation or compensation through the use of standard tables.

While the form of apparatus herein described constitutes a preferred embodiment of the invention, it is to be understood that the invention is not limited to this precise form of apparatus, and that changes may be made therein without departing from the scope of the invention, which is defined in the appended claims.

What is claimed is:

1. In a device for determining the amount of a gaseous constituent in a mixed fluid of known salinity at a known altitude and providing a direct reading of the quantitative amount of such constituent including:
    a gas sensor providing an output variable according to the partial pressure of the constituent in the fluid,
    amplifier means for receiving the signal from said sensor, 2. A device as defined in claim 1, including a salinity scale adjustable with respect to said second temperature scale as said first compensating means is adjusted to compensate the indicated output for solubility changes due to variations in the salinity of the fluid.

3. In a device for determining the amount of oxygen in a mixed fluid at a known altitude and providing a direct reading of the concentration of such oxygen including:
    a polarographic cell providing an output signal variable according to the partial pressure of the oxygen in the fluid,
    electronic amplifier means for receiving the signal from said cell,
    a meter driven by said amplifier means including a first temperature scale and an oxygen concentration scale,
    a thermistor arranged to respond to the temperature of the fluid to which said cell is exposed,
    means for selectively connecting the output of said thermistor or the output of said cell or both of said outputs to said amplifier means in order to measure selectively the temperature of said fluid when the thermistor alone is connected or to measure said oxygen concentration, compensated for temperature variations in said cell output, when both said sensors are connected, the improvement comprising:
    an indicator driven by said amplifier means including temperature and constituent concentration scales,
    a temperature sensor arranged to respond to the temperature of the fluid to which said gas sensor is exposed, said temperature sensor having a resistance/temperature characteristic suitable for compensating the gas sensor output for variations in the temperature of the fluid,
    means for selectively connecting the output of said temperature sensor or the output of said gas sensor or both of said outputs to said amplifier means in order to measure selectively the temperature of said fluid when the temperature sensor alone is connected or to measure said constituent concentration, compensated for temperature variations, when both said sensors are connected, the improvement comprising:
    a first adjustable compensating means including a second temperature scale corresponding in range to the indicator temperature scale arranged in circuit with said indicator for compensating the gas sensor output for variations in the constituent solubility in the fluid due to changes in the indicated temperature when said temperature sensor and said gas sensor are connected to compensate for temperature variations in the gas sensor output, and a second adjustable compensating means arranged in circuit with said indicator for compensating the gas sensor output for variations in the constituent solubility in the fluid due to pressure changes at said known altitude and an altitude scale on said indicator, whereby said indicator may be adjusted to show the appropriate altitude on said altitude scale when said temperature sensor and said gas sensor are connected to compensate for temperature variations in the gas sensor output.

a compensating circuit including a first adjustable element arranged to be preset for compensating the output of said meter according to changes in the solubility of the oxygen in the fluid with changes in temperature when said thermistor and said cell are connected to compensate for temperature variations in the cell output, an adjustable dial connected to said first adjustable element, a second temperature scale cooperating with said dial to provide adjustment of said adjustable element according to the indication of said meter on said first temperature scale, and a second adjustable compensating means arranged in circuit with said indicator for compensating the cell output for variations in the oxygen solubility in the fluid due to pressure changes at said known altitude and an altitude scale on said indicator, whereby said indicator may be adjusted to show the appropriate altitude on said altitude scale when said thermistor and said cell are connected to compensate for temperature variations in the cell output.

* * * * *

UNITED STATES PATENT OFFICE
CERTIFICATE OF CORRECTION

Patent No. 3,685,346  Dated August 22, 1972

Inventor(s) Everett W. Molloy

It is certified that error appears in the above-identified patent and that said Letters Patent are hereby corrected as shown below:

In the claims, following the end of claim 1 at Column 5, line 60, the text beginning at Column 6, line 23 "an indicator driven..." through Column 6, line 60 should be read as part of claim 1.

In claim 3, the text should skip from Column 6, line 22 to Column 6, line 61.

Signed and sealed this 6th day of February 1973.

(SEAL)
Attest:

EDWARD M. FLETCHER, JR.
Attesting Officer

ROBERT GOTTSCHALK
Commissioner of Patents